(12) United States Patent
Asakawa et al.

(10) Patent No.: US 8,412,444 B2
(45) Date of Patent: Apr. 2, 2013

(54) ENGINE CONTROL APPARATUS

(75) Inventors: Hideaki Asakawa, Kobe (JP); Takayuki Yano, Kobe (JP)

(73) Assignee: Mitsubishi Electric Corporation, Tokyo (JP)

( * ) Notice: Subject to any disclaimer, the term of this patent is extended or adjusted under 35 U.S.C. 154(b) by 770 days.

(21) Appl. No.: 12/644,781

(22) Filed: Dec. 22, 2009

(65) Prior Publication Data

US 2010/0250099 A1 Sep. 30, 2010

(30) Foreign Application Priority Data

Mar. 26, 2009 (JP) ................................ 2009-077059

(51) Int. Cl.
*G06F 19/00* (2011.01)
*G06F 7/00* (2006.01)
*G06F 17/00* (2006.01)

(52) U.S. Cl. .................... 701/114; 701/104; 123/479

(58) Field of Classification Search .................. 701/104, 701/114; 123/479
See application file for complete search history.

(56) References Cited

U.S. PATENT DOCUMENTS

| | | | | |
|---|---|---|---|---|
| 4,495,927 A | * | 1/1985 | Yamato | 123/491 |
| 4,683,859 A | * | 8/1987 | Tamura et al. | 123/491 |
| 4,694,807 A | * | 9/1987 | Mori | 123/501 |
| 4,846,131 A | * | 7/1989 | Uchinami et al. | 123/479 |
| 5,526,267 A | * | 6/1996 | Sogawa | 701/114 |
| 6,636,989 B1 | * | 10/2003 | Kondo et al. | 714/23 |
| 7,962,274 B2 | * | 6/2011 | Yonezawa et al. | 701/103 |

FOREIGN PATENT DOCUMENTS

| | | |
|---|---|---|
| JP | 2006-329129 A | 12/2006 |
| JP | 2007-218202 A | 8/2007 |

\* cited by examiner

*Primary Examiner* — Stephen K Cronin
*Assistant Examiner* — David Hamaoui
(74) *Attorney, Agent, or Firm* — Sughrue Mion, PLLC

(57) ABSTRACT

There is provided an engine control apparatus that makes it possible that, even in the case where an abnormality occurs in a microcomputer and the operations of the injectors in a series of cylinders are interrupted, there is obtained continuous driving without interruption of the engine, when the microcomputer is restored to normal condition. The microcomputer stores in a backup RAM the injection cylinder and the injection fuel amount at a time when a main fuel injection control means sequentially outputs a drive signal to each of the injectors of the cylinders. After the microcomputer 11 is reset due to detection of an abnormality therein and then is restarted, the post-resetting injection cylinder determining means 31 in the microcomputer determines cylinders into which fuel could not be injected during reset period, based on an fuel injection cylinder that has been stored in a backup RAM 11*a* at a time immediately prior to the resetting, and fuel is immediately and asynchronously injected into the determined cylinders at an injection fuel amount that has been stored in the backup RAM 11*a* at a time immediately prior to the resetting.

4 Claims, 4 Drawing Sheets

ENGINE CONTROL APPARATUS

BACKGROUND OF THE INVENTION

1. Field of the Invention

The present invention relates to an engine control apparatus and particularly to an engine control apparatus having a function in which a microcomputer controls the injection of a fuel to be supplied to an engine.

2. Description of the Related Art

It is commonly known that an engine control apparatus that is mounted in a vehicle and has a function of controlling fuel injection is provided with a microcomputer that controls fuel injection for an engine, based on input signals from various kinds of sensors for monitoring the operation status of the engine and the driving condition of the vehicle and a monitoring device that monitors the microcomputer and determines whether or not there exists an abnormality in the microcomputer.

In an engine control apparatus of this kind, a monitoring device that determines whether or not there exists an abnormality in a microcomputer has a function of forcibly resetting and restarting the microcomputer when any abnormality in the microcomputer is detected. It is the objective of the foregoing function that, in the case where there occurs an abnormality in a microcomputer that performs principal control items such as fuel injection control and ignition control for an engine, the microcomputer is restored to a normally controlled state so that abnormal control is prevented from being continuously performed. In general, when a microcomputer is reset, the operations of actuators, such as an injector and the like, which are driven by the microcomputer are interrupted; therefore, fuel injection is interrupted during a reset period from a time instant when the microcomputer is reset to a time instant when normal control is restored after a restart of the microcomputer.

Accordingly, in a conventional engine control apparatus, in the case where, due to an abnormality in a microcomputer caused by a transient factor, a microcomputer is reset, fuel injection is interrupted during a reset period; thus, output torque produced by combustion cannot be obtained. As a result, while the engine is idled, the operation of engine is interrupted in some cases even in the case where resetting and restarting restores the microcomputer to its normal condition. In recent years, thanks to enhancement in the performances of a microcomputer, the reset period has been shortened; however, in the case where the interruption of fuel injection caused during the reset period continues to a time instant after which torque enough to keep the engine rotating cannot be obtained, the interruption of the operation of the engine cannot be prevented.

To date, there has been proposed an engine control apparatus in which, in order to prevent such an interruption of an engine, a monitoring device has an added function for driving an injector and an ignition device (e.g., refer to Japanese Patent Application Laid-Open No. 2006-329129). In a conventional engine control apparatus disclosed in Japanese Patent Application Laid-Open No. 2006-329129, not only is there provided an output driver that drives an injector and an ignition device based on an injection command for the injector and an ignition command for the ignition device from a microcomputer, but also a monitoring device, formed of an auxiliary microcomputer, has an added function in which engine-accelerator-pedal position information, air-intake amount information, rotation speed information, and the like are inputted from various kinds of sensors; the ignition command and the injection command are sequentially created based on these information pieces inputted from the sensors and are outputted to the output driver through serial communication; then the injector and the ignition device are driven. The conventional engine control apparatus disclosed in Japanese Patent Application Laid-Open No. 2006-329129 makes it possible that, when an abnormality once occurs in the main microcomputer, the monitoring device can replace the main microcomputer to perform ignition control and fuel injection control even in the case where the main microcomputer is restored to its normal condition after the abnormality disappears.

Moreover, there has been proposed an engine control apparatus that prevents the engine from being interrupted when, during idling of the engine, there frequently occurs resetting that is not intended by the microcomputer (e.g., refer to Japanese Patent Application Laid-Open No. 2007-218202). A conventional engine control apparatus disclosed in Japanese Patent Application Laid-Open No. 2007-218202 is configured in such a way that, in the case where unintended forcible resetting occurs in a microcomputer, a backup RAM stores initialization processing implementing dates/hours and the number of times of resetting instances at a timing of post-resetting initialization processing; based on the stored initialization processing implementing dates/hours, an initialization processing interval between immediately previous forcible resetting and present forcible resetting is calculated; then, in the case where the calculated initialization processing interval is within a predetermined time period that is preliminarily set because, when the engine is being idled and forcible resetting continually occurs, the engine may stop, the idling rotation speed is raised by a predetermined amount for a predetermined time period, in accordance with the calculated initialization processing interval and the stored number of times of resetting instances. As a result, the engine is prevented from being interrupted when, during idling of the engine, there frequently occurs resetting that is not intended by the microcomputer.

In the conventional engine control apparatus disclosed in Japanese Patent Application Laid-Open No. 2006-329129, the monitoring device has an added function for driving an injector and an ignition device; therefore, it is inevitable that the scale and the cost of the engine control apparatus are increased.

Moreover, even in the case of the conventional engine control apparatus disclosed in Japanese Patent Application Laid-Open No. 2007-218202, when the reset period falls within a specific period, the engine cannot be prevented from being interrupted even though, after the reset period, the amount of air is increased so as to raise the idling rotation speed. FIG. 5 is an explanatory chart for the typical fuel injection pattern of a typical 4-cycle and 4-cylinder engine. In FIG. 5, at predetermined timing, a main fuel injection control means in a microcomputer sequentially injects a fuel in the first cylinder #1, the second cylinder #2, the third cylinder #3, and the fourth cylinder #4 (hereinafter, the cylinders are referred to as #1 cylinder, #2 cylinder, #3 cylinder, and #4 cylinder, respectively). FIG. 5 represents a case where resetting is implemented at a time instant T1 because an abnormality in the microcomputer has been detected, and then restarting through the resetting is completed at a time instant T2, whereupon the microcomputer is restored to normal condition. Because a driving signal transmitted from the microcomputer to the injector is interrupted during the reset period $T_R$, the fuel to be injected in #1 cylinder and #3 cylinder during the reset period $T_R$ is not injected. Accordingly, even though the microcomputer is restarted through the resetting and restored to normal condition, #1 cylinder and #3 cylinder do not contribute to combustion of fuel because no fuel has been filled into #1 cylinder and #3 cylinder.

In general, it is well known that, in the case where the engine is being idled and no fuel can be filled into a series of cylinders, the engine is more likely to stop. Therefore, even in the case of the conventional engine control apparatus disclosed in Japanese Patent Application Laid-Open No. 2007-218202, when the reset period corresponds to the period $T_R$ in FIG. 5, the engine cannot be prevented from being interrupted even though, after the reset period, the amount of air is increased so as to raise the idling rotation speed.

SUMMARY OF THE INVENTION

The present invention has been implemented in order to solve the foregoing problems in the conventional apparatuses; the objective thereof is to provide an engine control apparatus that has a simple configuration in which a monitoring device or the like other than a microcomputer is not required to have a microcomputer's function of driving an injector and an ignition device and that makes it possible that, even in the case where an abnormality occurs in the microcomputer and the operations of the injectors in a series of cylinders are interrupted, there is obtained continuous driving without interruption of the engine, when the microcomputer is restarted and restored to normal condition through resetting.

An engine control apparatus, for controlling a multi-cylinder engine, according to the present invention is provided with a main fuel injection control means that sequentially injects fuel of a quantity that makes a predetermined air-fuel ratio into respective cylinders at a predetermined crank angle timing; a fuel injection information storage means that stores an injection cylinder into which the main fuel injection control means actually injects fuel and an injection fuel amount on that occasion; a microcomputer resetting means that resets and then restarts a microcomputer including the main fuel injection control means, when any abnormality in the microcomputer is detected; a post-resetting injection cylinder determining means that determines at least a cylinder into which fuel has not injected by the main fuel injection control means during reset period, based on an injection cylinder stored by the fuel injection information storage means; and an asynchronous fuel injection control means that injects fuel into a cylinder determined by the post-resetting injection cylinder determining means at an injection fuel amount stored by the fuel injection information storage means, in the case where it is determined that the microcomputer has been restarted by the microcomputer resetting means.

An engine control apparatus according to the present invention is preferably configured in such a way that the post-resetting injection cylinder determining means calculates the number of cylinders into which fuel could not be injected during a reset period for the microcomputer, based on the reset period and an engine rotation speed at a time when the reset occurs, and determines, as cylinders into which fuel could not be injected during the reset period, cylinders that include a cylinder into which fuel should have been injected immediately following an injection cylinder that has been stored by the fuel injection information storage means at a time immediately prior to the resetting and that correspond to the calculated number of cylinders.

Moreover, an engine control apparatus according to the present invention is preferably configured in such a way that the fuel injection information storage means stores air-amount information that has been utilized in determining an amount of fuel that is actually injected by the main fuel injection control means, and utilizes the stored air-amount information as an initial value of air-amount information for determining an amount of fuel to be injected by the main fuel injection control means after restart of the microcomputer.

An engine control apparatus according to the present invention is provided with a main fuel injection control means that sequentially injects fuel of a quantity that makes a predetermined air-fuel ratio into respective cylinders at a predetermined crank angle timing; a fuel injection information storage means that stores an injection cylinder into which the main fuel injection control means actually injects fuel and an injection fuel amount on that occasion; a microcomputer resetting means that resets and then restarts a microcomputer including the main fuel injection control means, when any abnormality in the microcomputer is detected; a post-resetting injection cylinder determining means that determines at least a cylinder into which fuel has not injected by the main fuel injection control means during reset period, based on an injection cylinder stored by the fuel injection information storage means; and an asynchronous fuel injection control means that injects fuel into a cylinder determined by the post-resetting injection cylinder determining means at an injection fuel amount stored by the fuel injection information storage means, in the case where it is determined that the microcomputer has been restarted by the microcomputer resetting means. Therefore, in the engine control apparatus, it is made possible that, even in the case where an abnormality occurs in a microcomputer and the operations of the injectors in a series of cylinders are interrupted, there is obtained continuous driving without interruption of the engine, when the microcomputer is restored to normal condition.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Embodiment 1

Figure 1:
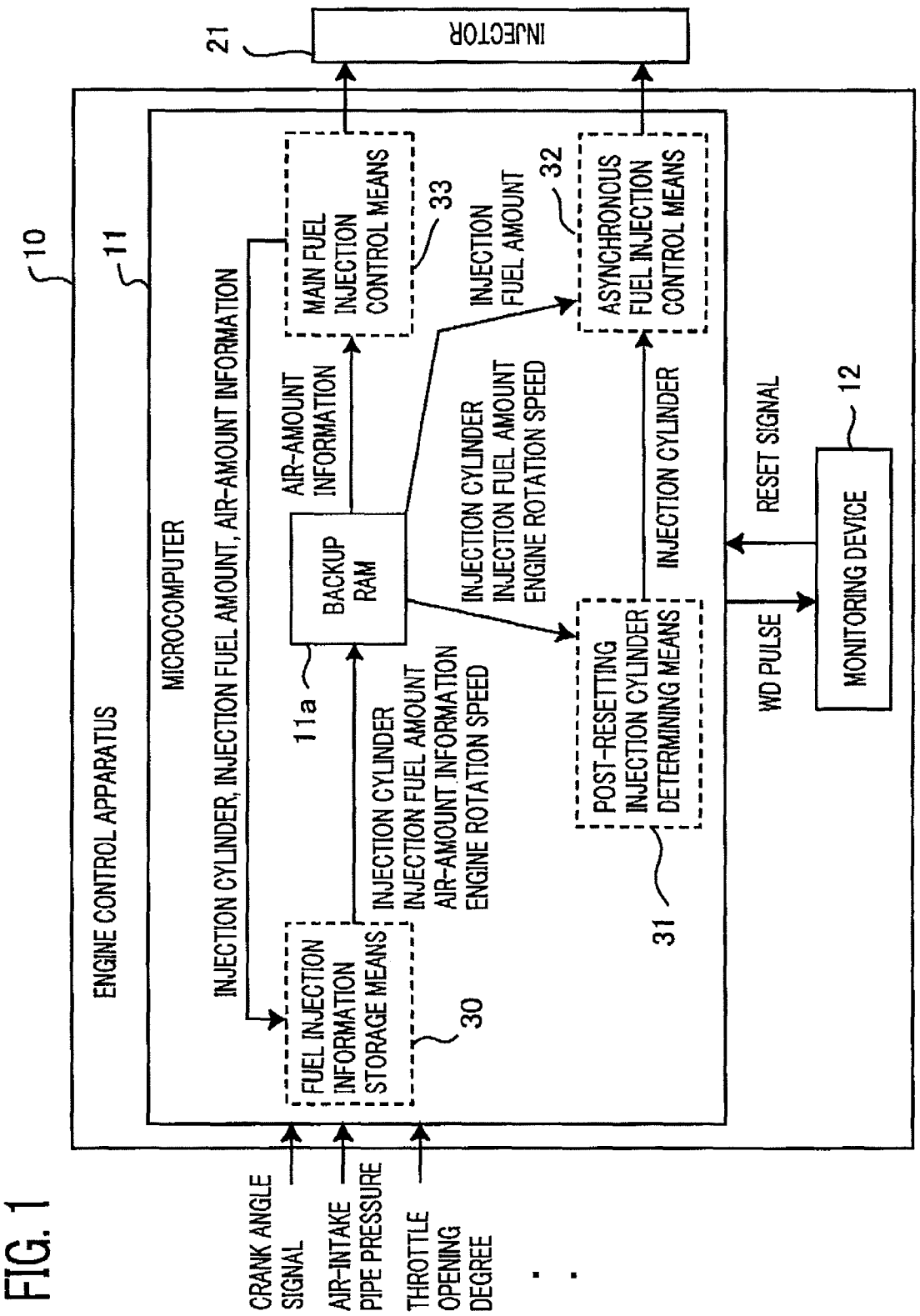
FIG. 1 is a block diagram illustrating the configuration of an engine control apparatus according to Embodiment 1 of the present invention.

An engine control apparatus according to Embodiment 1 of the present invention will be explained in detail with reference to the accompanying drawings. FIG. 1 is a block diagram illustrating an engine control apparatus according to Embodiment 1 of the present invention. In FIG. 1, an engine control apparatus 10 is configured with a microcomputer 11 for performing fuel injection control for an engine and a monitoring device 12 that monitors the operation of the microcomputer 11. Although, as described later, forming a microcomputer resetting means, the monitoring device 12 will be referred to as a monitoring device in FIG. 1 and the explanation below. The microcomputer 11 includes a main fuel injection control means 33, a fuel injection information storage means 30, a backup RAM 11a, a post-resetting injection cylinder determining means 31, and an asynchronous fuel injection control means 32. The fuel injection information storage means 30 and the backup RAM 11a configure a fuel injection information storage means in an engine control apparatus according to Embodiment 1 of the present invention.

The main fuel injection control means 33 is provided with its original function of performing fuel injection control in the engine control apparatus 10, i.e., a function of outputting an injection command signal to each of the respective injectors 21 in the cylinders of an engine, based on engine operation information items such as a crank angle signal, an air-intake pipe pressure, and a throttle opening degree; the main fuel injection control means 33 is also provided with a function of adopting air-amount information stored in the backup RAM 11a as an initial air-amount value utilized for calculating the amount of fuel to be injected, in the case where, during activation of the microcomputer 11, an abnormality in the microcomputer 11 is detected and then the microcomputer 11 is restarted through resetting. Various kinds of literatures have introduced the details of injection-fuel-amount calculation control performed by the main fuel injection control means 33; therefore, the explanation thereof will be omitted here.

The injector 21 injects and supplies a fuel into the engine during the air-intake stroke, based on the injection command signal from the main fuel injection control means 33 in the microcomputer 11. In the case of a multi-cylinder engine, it is typical that fuel is sequentially injected into the cylinders. For example, in the case of a four-cylinder engine, fuel is injected into #1 cylinder, #3 cylinder, #4 cylinder, and #2 cylinder, in that order.

At each predetermined cranking timing, the fuel injection information storage means 30 stores the injection cylinder, the injection fuel amount, the air-amount information, and the engine rotation speed corresponding to fuel injection performed based on the injection command signal outputted from the main fuel injection control means 33. The backup RAM 11a backup-stores the injection cylinder, the injection fuel amount, the air-amount information, and the engine rotation speed that have been stored by the fuel injection information storage means 30.

When the microcomputer 11 is reset and restored through a reset signal from the monitoring device 12 described later, the post-resetting injection cylinder determining means 31 determines post-reset/restoration asynchronous fuel injection cylinders, based on the fuel injection cylinder and the injection fuel amount that have been stored in the backup RAM 11a at a time instant immediately prior to the resetting. In Embodiment 1, the asynchronous fuel injection cylinders are determined by including at least the cylinder immediately following the fuel injection cylinder, as a reference, that has been stored immediately prior to the resetting. In addition, in order to determine the post-reset/restoration asynchronous fuel injection cylinders, it is required to more correctly obtain the cylinder into which fuel could not be injected during the reset period.

The determination, of the foregoing post-reset/restoration asynchronous fuel injection cylinders, by the post-resetting injection cylinder determining means 31 is implemented in such a way as described below. That is to say, the number of cylinders into which fuel could not be injected during a reset period is calculated by utilizing the equation (1) below, based on the engine rotation speed stored in the backup RAM 11a and the reset period that is preliminarily and uniquely determined by the microcomputer 11.

[Number of cylinders into which fuel could not be injected during reset period]=[reset period of microcomputer]÷[air-intake stroke period obtained from engine rotation speed at a time instant when resetting occurs]  (1)

After that, by counting the number of cylinders from the cylinder immediately following the fuel injection cylinder, as a reference, that has been stored immediately prior to the resetting, there are determined cylinders, as the asynchronous fuel injection cylinders, the number of which corresponds to the calculated number of cylinders into which fuel could not be injected during the resetting period. In addition, in Embodiment 1, the number of cylinders is calculated in accordance with the equation (1); however, it goes without saying that the number of cylinders may be calculated from a table of correlation between the resetting time instant for the microcomputer 11 and the engine rotation speed at the resetting time instant.

In the case where, during activation of the microcomputer 11, an abnormality in the microcomputer 11 is detected and then the microcomputer 11 is restarted through resetting, the asynchronous fuel injection control means 32 outputs an injection command signal based on the injection fuel amount stored in the backup RAM 11a to the injectors 21 for the asynchronous fuel injection cylinders determined by the post-resetting injection cylinder determining means 31 so as to have these injectors 21 immediately inject fuel into the asynchronous fuel injection cylinders.

The monitoring device 12 provided in the engine control apparatus 10 monitors a watch dog pulse signal (referred to as a WD pulse signal, hereinafter); in the case where any abnormality in the WD pulse signal is recognized, the monitoring device 12 outputs a reset signal to the microcomputer 11 so as to forcibly reset the microcomputer 11.

In Embodiment 1, an abnormality in the microcomputer 11 is detected through the WD pulse signal; however, it may also be detected through a means other than the WD signal. Additionally, in Embodiment 1, an abnormality in the microcomputer 11 is detected by the monitoring device 12; however, it may also be detected by use of a function of the microcomputer 11 itself, i.e., it does not matter which method is utilized to detect an abnormality in the microcomputer 11.

Next, the operation of an engine control apparatus according to Embodiment 1 of the present invention will be explained. After activation of the microcomputer 11, the original fuel injection control is performed by the main fuel injection control means 33 at each predetermined cranking timing; then, as described above, the injection command signal is outputted to each of the respective injectors 21 in the cylinders of an engine, based on engine operation information items such as the crank angle signal, the air-intake pipe pressure, and the throttle opening degree. As a result, in the case of a four-cylinder engine, fuel is injected into #1 cylinder, #3 cylinder, #4 cylinder, and #2 cylinder, in that order.

Figure 2:
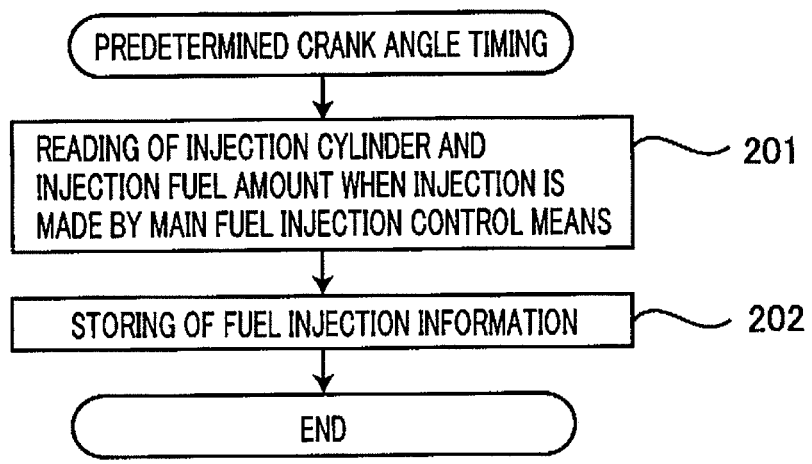
FIG. 2 is a flowchart representing processing, performed in an engine control apparatus according to Embodiment 1 of the presents invention, for fuel injection control that is implemented at a timing of a predetermined crank angle after activation of the microcomputer.

FIG. 2 is a flowchart representing processing, performed in the engine control apparatus according to Embodiment 1 of the present invention, for fuel injection control that is constantly and repeatedly implemented at each predetermined cranking timing after activation of the microcomputer. In the step 201 in FIG. 2, the fuel injection information storage means 30 reads the injection cylinder that has injected fuel in accordance with the injection command signal from the main fuel injection control means 33, the injection fuel amount of that cylinder, and the air-amount information. Next, the step 201 is followed by the step 202, where the injection cylinder and the injection fuel amount that have been read in the step 201, the air-amount information, and the engine rotation speed are stored in the backup RAM 11a.

Figure 3:
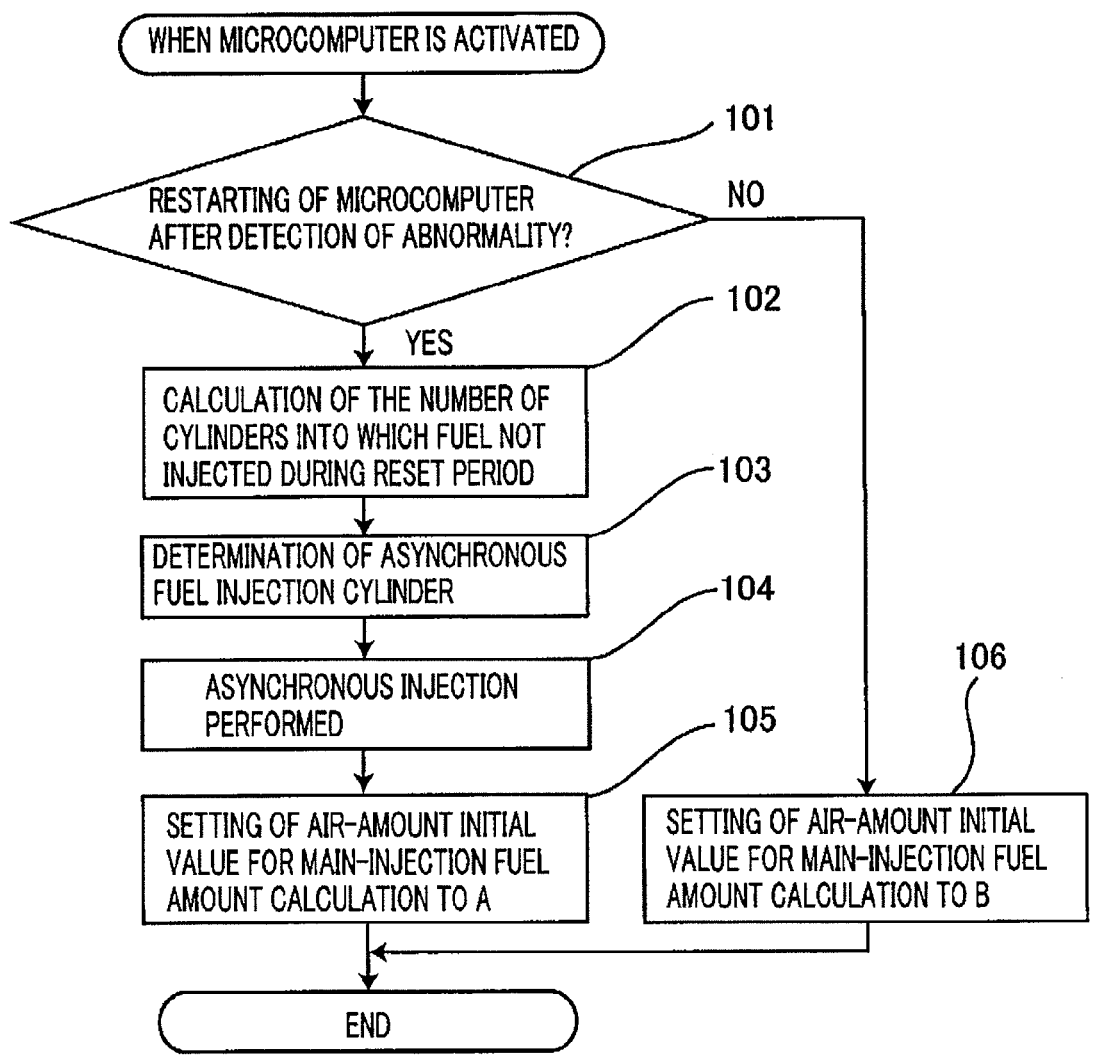
FIG. 3 is a flowchart representing processing performed by an engine control apparatus according to Embodiment 1 of the present invention when a microcomputer is activated.

FIG. 3 is a flowchart representing processing that is implemented only once when the microcomputer 11 is activated. The processing represented in FIG. 3 is implemented only once when the microcomputer 11 is activated; after that, the processing is not implemented until the microcomputer 11 is activated when the ignition key is turned on or until the microcomputer 11 is restarted through resetting after an abnormality in the microcomputer 11 has detected.

In FIG. 3, in the step 101, it is determined whether or not the present restarting is caused by resetting implemented after an abnormality in the microcomputer 11 is detected; in the case where it is determined that the present restarting is caused by resetting implemented after an abnormality in the microcomputer 11 is detected (in the case of "YES"), the step 101 is followed by the step 102. Whether or not the present restarting is caused by resetting implemented after an abnormality in the microcomputer 11 is detected can be determined, for example, in such a way that, when the operation of the microcomputer 11 is normally ended through turning off the ignition key, a specific value is stored in the backup RAM 11a, and then it is determined whether or not a value stored after the microcomputer 11 is restarted and the specific value stored when the operation of the microcomputer 11 is normally ended coincide with each other; however, the detailed explanation thereof will be omitted here.

Next, in the step 102, the post-resetting injection cylinder determining means 31 calculates the number of cylinders into which fuel could not be injected through the main fuel injection control means 33 during the reset period for the microcomputer 11; then, the step 102 is followed by the step 103. As described above, by utilizing the equation (1), the calculation in the step 102 is performed in such a way that the engine rotation speed stored in the backup RAM 11a is read, and based on the read engine rotation speed and the reset period that is preliminarily and uniquely determined in accordance with the microcomputer 11, the equation (1) is utilized.

Next, in the step 103, the post-resetting injection cylinder determining means 31 determines the asynchronous fuel injection cylinder; then, the step 103 is followed by the step 104. By counting the number of cylinders from the cylinder immediately following the fuel injection cylinder, as a reference, that has been stored immediately prior to the resetting and is read from the backup RAM 11a, there are determined cylinders, as the asynchronous fuel injection cylinders, the number of which corresponds to the number of cylinders calculated in the step 102.

In the step 104, the injection fuel amount that has been stored in the backup RAM 11a at a time immediately prior to resetting is read; the asynchronous fuel injection control means 32 outputs the injection command signal based on the read injection fuel amount to the injector 21 corresponding to the cylinder that has been determined in the step 103; then, the injector 21 asynchronously injects fuel into the corresponding cylinder.

Next, the step 104 is followed by the step 105, where the main fuel injection control means 33 sets an air-amount initial value utilized for calculating the amount of main injection fuel. In this embodiment, the air-amount information stored in the backup RAM 11a is read, and then the air-amount initial value is set to a read air amount A. The air amount A is an air amount that has been utilized for calculating the amount of main injection fuel at a time immediately prior to resetting.

In contrast, in the case where, in the step 101, it is determined that the present restarting is not caused by resetting implemented after an abnormality in the microcomputer 11 is detected; processings in the steps 102 to 105 are omitted, and the step 101 is followed by not the step 105 but the step 106, where the initial value of the air amount, utilized by the main fuel injection control means 33 to calculate the injection fuel amount, is set to an air amount B, which is obtained by anticipating an engine stall.

In the engine control apparatus according to Embodiment 1 of the present invention, the microcomputer 11 is provided with the fuel injection information storage means 30 and the backup RAM 11a that serve as a fuel injection information storage means for storing the injection cylinder and the injection fuel amount when there is performed main fuel injection control in which the injection command signals are sequentially outputted to the respective injectors 21 of the cylinders. The backup RAM 11a is configured in such a way as to be able to maintain the memory contents even in the case where the operation of the microcomputer 11 is interrupted; therefore, even in the case where, when an abnormality in the microcomputer 11 is detected, the microcomputer 11 is restarted through resetting, the injection cylinder and the injection fuel amount that have been stored immediately prior to the resetting can be maintained.

The microcomputer 11 also includes the post-resetting injection cylinder determining means 31 that determines the fuel injection cylinder based on injection cylinder information that has been stored in the backup RAM 11a at a time immediately prior to resetting, in the case where the microcomputer is reset by a reset signal outputted from the monitoring device 12 when the monitoring device 12 detects an abnormality in the microcomputer 11 and is restarted. As a result, during the reset period, there can be uniquely obtained at least the cylinder into which fuel could not be injected by the main fuel injection control means 33. In other words, because the backup RAM 11a stores the injection cylinder at a time immediately prior to the resetting, it is made possible that, when the microcomputer is restarted through resetting, a cylinder into which fuel could not injected during the reset period is estimated.

Figure 4:
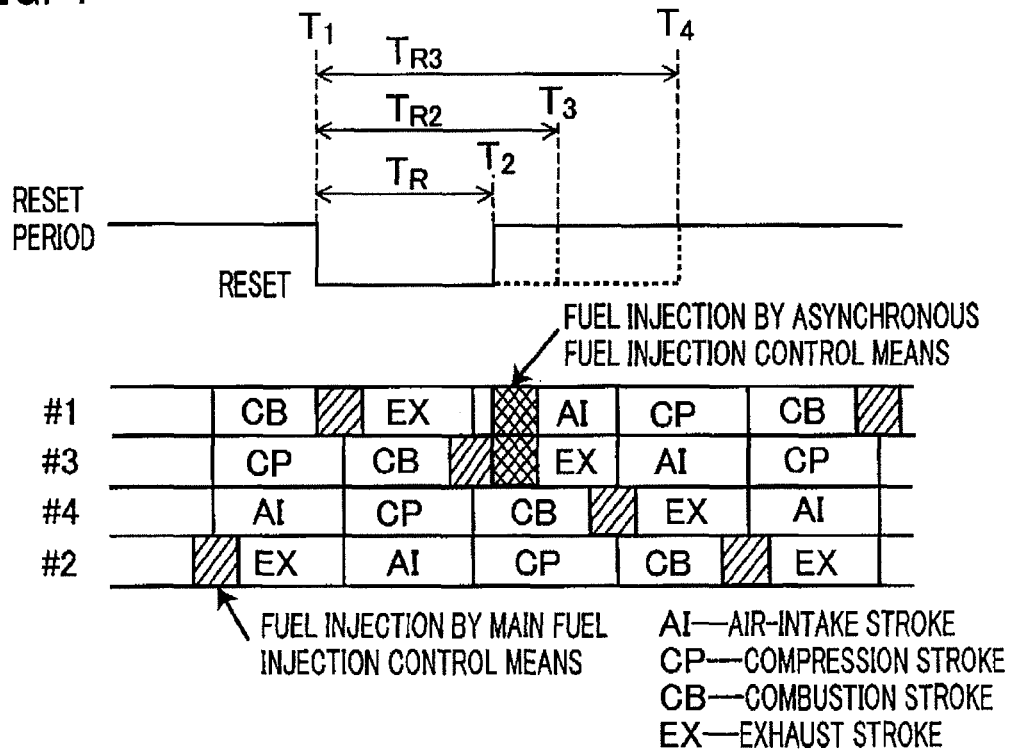
FIG. 4 is an explanatory chart representing the fuel injection pattern of a 4-cycle and 4-cylinder engine when asynchronous fuel injection is performed by an engine control apparatus according to Embodiment 1 of the present invention.
Figure 5:
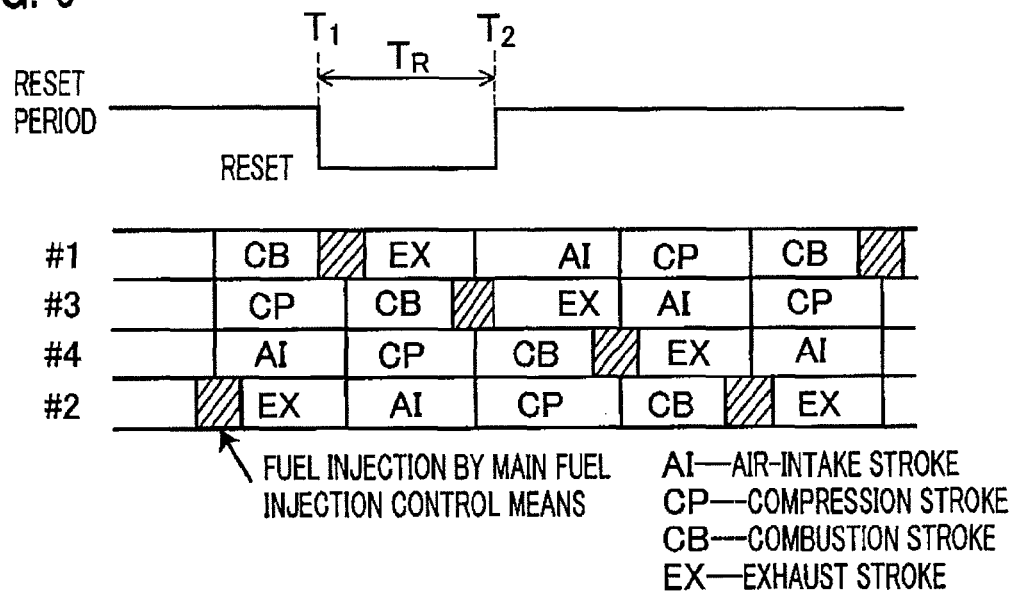
FIG. 5 is an explanatory chart, in the case of a conventional engine control apparatus, representing the fuel injection pattern of a 4-cycle and 4-cylinder engine.

FIG. 4 is an explanatory chart representing the fuel injection pattern of a 4-cycle and 4-cylinder engine when asynchronous fuel injection is performed by an engine control apparatus according to Embodiment 1 of the present invention; FIG. 4 represents a fuel injection pattern in the case where, in a typical 4-cycle and 4-cylinder engine, as is the case with FIG. 5, asynchronous fuel injection is applied to a cylinder into which fuel could not be injected by the asynchronous fuel injection control means 32 during the reset period for the microcomputer 11.

In FIG. 4, the main fuel injection control means 33 in the microcomputer 11 sequentially injects fuel into #1 cylinder, #2 cylinder, #3 cylinder, and #4 cylinder at predetermined timings. Provided the microcomputer 11 is reset by the reset signal from the monitoring device 12 at a time instant T1 and is restarted at a time instant T2, the asynchronous fuel injection control means 32 immediately inject fuel, at the time instant T2, into #1 cylinder and #3 cylinder into which fuel could not be injected during the reset period $T_R$. Accordingly, after the microcomputer 11 is restarted through resetting, there exists no cylinder which cannot be filled with fuel.

In the case where the microcomputer 11 is reset at the time instant T1 and restarted through resetting at a time instant T3, the reset period $T_{R2}$ corresponds to two consecutive cylinders; therefore, the time instant T3 when the microcomputer 11 is restarted through the resetting is delayed to fall into the air-intake stroke of #1 cylinder. In this case, #1 cylinder cannot be filled with fuel; however, because the asynchronous fuel injection control means 32 can fill fuel into #3 cylinder following #1 cylinder, there exist no consecutive cylinders into which fuel cannot be filled.

As a result of the foregoing configuration, even though the engine control apparatus is simply configured in such a way that the monitoring device 12 or the like other than the microcomputer 11 does not have a function of driving the injector 21 and the ignition device, which are to be driven by the microcomputer 11, as long as the microcomputer 11 is restarted through resetting and then is restored to normal operating condition, not only can the cylinder into which fuel could not be injected during the reset period be filled with a fuel-air mixture that contributes to combustion, but also it can be prevented that there exist consecutive cylinders into which fuel cannot be filled, even in the case where, due to resetting implemented when an abnormality in the microcomputer occurs, a plurality of consecutive injectors 21 is once interrupted from operating during the reset period. As a result, output torque is obtained through fuel combustion, whereby the engine can be prevented from being interrupted.

In the case where, as represented in FIG. 4, the microcomputer 11 is reset at the time instant T1 and restarted through resetting at a time instant T4 and the reset period $T_{R3}$ corresponds to three consecutive cylinders, fuel cannot be filled into #1 cylinder and #3 cylinder, even if the asynchronous fuel injection control means 32 injects fuel at the time instant T4 when the microcomputer 11 is restarted through the resetting. Therefore, there exists a plurality of cylinders into which fuel cannot be filled.

Because the reset period for the microcomputer 11 is uniquely determined by the microcomputer 11, when the engine rotates at high speed, there often exists a plurality of cylinders into which fuel cannot be filled during the reset period; however, on the other hand, it is also well known that, even in the case where resetting keeps a plurality of consecutive cylinders from being filled with fuel, inertia of the engine tends to maintain the rotation of the engine, as long as the microcomputer is normally restarted.

Accordingly, in order to effectively operate the engine control apparatus according to Embodiment 1 of the present invention, it is desirable that the reset period for the microcomputer is shorter than a time in which, while the engine is idled, it becomes possible to apply main fuel injection control to at least half of the engine cylinders, i.e., a time in which the engine rotates once.

In general, even in the case where the microcomputer 11 is reset, the engine rotation speed is maintained due to an inertia effect. Accordingly, when the reset period is short, reduction of the rotation speed caused by resetting is small; thus, when the throttle opening degree at a time immediately prior to the resetting is maintained, the amount of air taken in by the cylinder is almost the same as that at the time immediately prior to the resetting. As a result, by injecting fuel, at a time immediately after the restoration of the microcomputer through resetting, into the cylinders into which fuel could not be injected by the asynchronous fuel injection control means 32 during the reset period, the number of cylinders into which fuel can not be injected can be reduced, and fuel can be filled at a fuel-air mixture rate that contributes to combustion.

When being activated through turning on the power switch, the microcomputer 11 is reset; therefore, in general, memories for processing implemented by the microcomputer 11 are initialized on that occasion. That is because, when the microcomputer 11 is not energized, the values in a memory become indefinite, unless a backup function or the like is provided. Here, the amount of fuel to be injected by the main fuel injection control means 33 is determined based on the amount of air filled in the cylinder in such a way that the air-fuel mixture rate becomes a predetermined rate. Accordingly, in general, the initial value of the air amount at a time when the power switch is turned on is set to an air amount obtained by anticipating activation during an engine stall. In contrast, also when the microcomputer 11 is reset due to detection of an abnormality therein and then is restarted, the initialization processing is performed, as is the case with activation at a time when the power switch is turned on; it is desirable that the air amount at this time corresponds to the engine operation condition at a time immediately prior to resetting.

Therefore, in the engine control apparatus according to Embodiment 1 of the present invention, the fuel injection information storage means 30 stores air amount information that determines the injection fuel amount, and when the microcomputer 11 is reset due to detection of an abnormality therein and then is restarted, the main fuel injection control means 33 utilizes the air amount information as the initial value of the air amount. As a result, it is made possible that, when the microcomputer 11 is reset due to detection of an abnormality therein and then is restarted, fuel is injected at an air-fuel mixture ratio in accordance with the engine operation condition at a time immediately prior to the resetting.

Various modifications and alterations of this invention will be apparent to those skilled in the art without departing from the scope and spirit of this invention, and it should be understood that this is not limited to the illustrative embodiments set forth herein.

What is claimed is:

1. An engine control apparatus for controlling a multi-cylinder engine, comprising
   a main fuel injection control means that sequentially injects fuel of a quantity that makes a predetermined air-fuel ratio into respective cylinders at a predetermined crank angle timing;
   a fuel injection information storage means that stores an injection cylinder into which the main fuel injection control means actually injects fuel and an injection fuel amount on that occasion;
   a microcomputer resetting means that resets and then restarts a microcomputer including the main fuel injection control means, when any abnormality in the microcomputer is detected;
   a post-resetting injection cylinder determining means that determines at least a missed cylinder into which fuel has not been injected by the main fuel injection control means during a reset period, based on an injection cylinder stored by the fuel injection information storage means; and
   an asynchronous fuel injection control means that injects fuel into a cylinder determined by the post-resetting injection cylinder determining means as being a missed cylinder, at an injection fuel amount stored by the fuel injection information storage means, in the case where it is determined that the microcomputer has been restarted by the microcomputer resetting means.

2. The engine control apparatus according to claim 1, wherein the post-resetting injection cylinder determining means calculates the number of missed cylinders into which fuel could not be injected during a reset period for the microcomputer, based on the reset period and an engine rotation speed at a time when the reset occurs, and determines, as cylinders into which fuel could not be injected during the reset period, cylinders that include a cylinder into which fuel should have been injected immediately following an injection cylinder that has been stored by the fuel injection information storage means at a time immediately prior to the resetting, and one or more other cylinders such that the total number of cylinders corresponds to the calculated number of missed cylinders.

3. The engine control apparatus according to claim 1, where in that the fuel injection information storage means stores air-amount information that has been utilized in determining an amount of fuel that is actually injected by the main fuel injection control means, and utilizes the stored air-amount information as an initial value of air-amount information for determining an amount of fuel to be injected by the main fuel injection control means after restart of the microcomputer.

4. The engine control apparatus according to claim 2, where in that the fuel injection information storage means stores air-amount information that has been utilized in determining an amount of fuel that is actually injected by the main fuel injection control means, and utilizes the stored air-amount information as an initial value of air-amount information for determining an amount of fuel to be injected by the main fuel injection control means after restart of the microcomputer.

\* \* \* \* \*